March 23, 1954     L. E. ORR     2,673,325
METHOD OF TESTING ELECTROCONDUCTIVE SURFACES
Filed Aug. 7, 1951     2 Sheets-Sheet 1
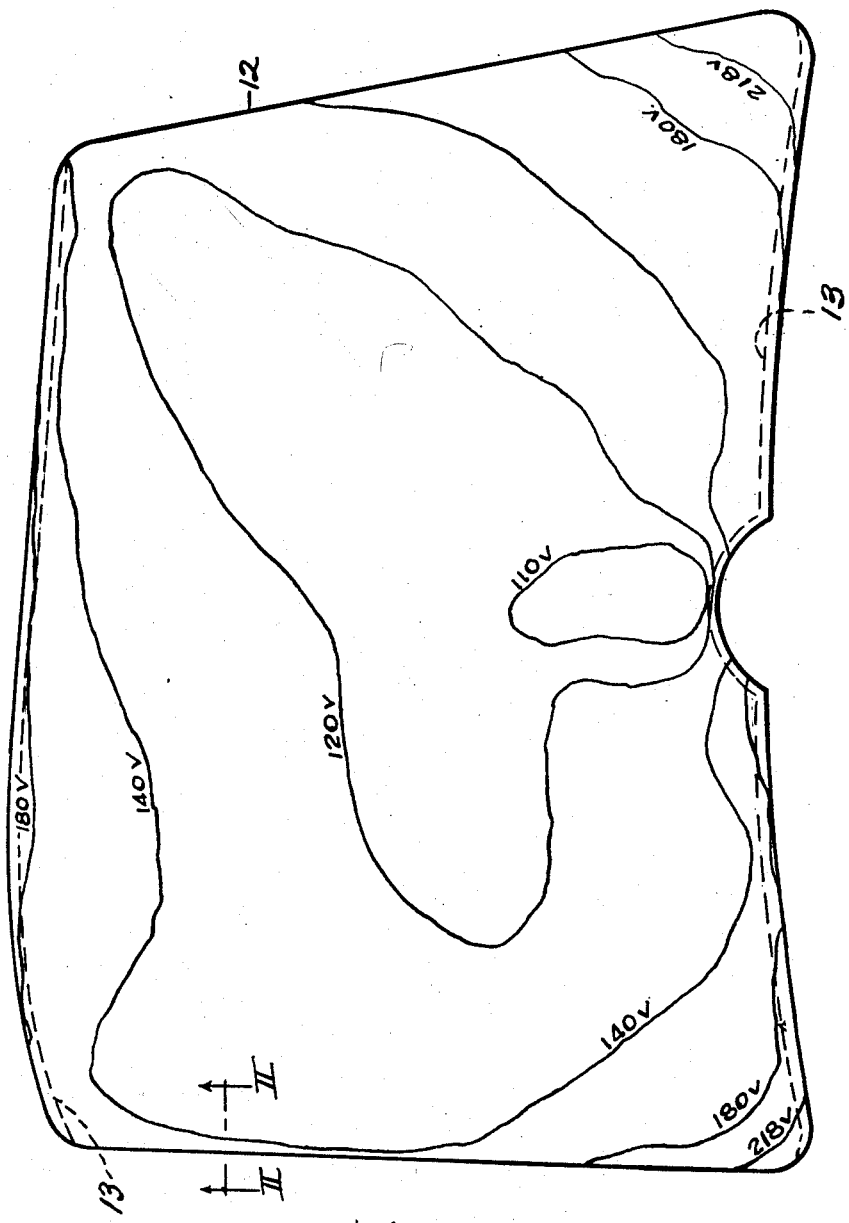
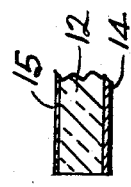
INVENTOR.
*LEIGHTON E. ORR*
BY
*Oscar L. Spencer*
ATTORNEY.

March 23, 1954 L. E. ORR 2,673,325
METHOD OF TESTING ELECTROCONDUCTIVE SURFACES
Filed Aug. 7, 1951 2 Sheets-Sheet 2

INVENTOR.
LEIGHTON E. ORR
BY
Oscar L. Spencer
ATTORNEY.

Patented Mar. 23, 1954

2,673,325

UNITED STATES PATENT OFFICE 2,673,325

METHOD OF TESTING ELECTROCONDUCTIVE SURFACES

Leighton E. Orr, Tarentum, Pa., assignor to Pittsburgh Plate Glass Company, Allegheny County, Pa., a corporation of Pennsylvania Application August 7, 1951, Serial No. 240,750

6 Claims. (Cl. 324—32)

This invention relates to a method of testing the surface conductivity distribution of articles having electroconductive surfaces. It is particularly directed to the testing of a refractory base which is coated with an electroconductive coating, such as a transparent electroconductive film, and it has particular relation to the use of such method to determine the distribution of heat generated by the coating or film when an electric potential is applied thereto.

It is known that transparent electroconductive films may be deposited upon glass by applying stannic chloride to the surface of glass heated above 400° F., preferably 850 to 1350° F. Films of superior conductivity may be produced according to methods described in a copending application for U. S. Letters Patent, Serial No. 762,658, filed July 22, 1947 by William O. Lytle, now Patent No. 2,614,944. These films or coatings are obtained by spraying plate, window or other glass while it is heated to a temperature of above 400° F., but below the temperature at which the glass becomes molten, with tin tetrachloride or other tin salts in aqueous solution or in vapor state, in the presence of a reducing agent such as methanol, phenyl hydrazine hydrochloride, or other agents.

The films thus obtained are of unknown composition but appear to contain a preponderant amount, of the order of 97 to 99 per cent or more, of a tin oxide and certain impurities which may include metallic tin, carbon, silicon, sodium and chlorine and other impurities, depending upon the composition of the applied tin-containing solution. These films have a thickness of about 50 to 800 millimicrons, are transparent, and have the unusual characteristic of being electroconductive, the particular degree of electroconductivity being dependent, to a large degree, upon the nature of the process of depositing the films. These oxide films have a resistance below about 500 ohms per unit square and a specific resistance below about 0.002 ohm centimeters. Further details respecting the production of these films will be supplied hereinafter.

The refractory base, usually of plate glass or other flat glass structure (including bent or curved glass structures), is provided with conducting metal strips suitable for bus bars. These strips are generally located adjacent the edges of the glass (usually within 0.5 inch of the edge) and, in the preferred embodiments, are located on opposed marginal edges. The bus bars may be applied to the glass base either before or after the transparent electroconductive film is applied to the base. When the bus bars are applied prior to the transparent electroconductive film, they must be capable of withstanding temperatures and oxidizing conditions of the application of the film and, therefore, preferably should be of a ceramic character. Furthermore, they should be capable of fusing or otherwise forming an adherent, well bonded coating to the glass. In practice, it has been found that the most satisfactory compositions for use in preparing the bus bars comprise a highly conductive metal powder (preferably gold or silver) and a vitrifying binder.

After application of the ceramic metal bus bars to the glass base by painting or other method, the sheet is heated to the temperature at which application of the conductive coating may be effected, for example, above about 800° F. but below the fusion point of the glass, usually 950 to 1150° F. During this heating operation, the ceramic metal coating is fused onto the base so that a firm bond is established between the base and the metal coating.

When the glass has been heated as above described for 1 or 2 minutes, it is withdrawn from the heating chamber and immediately is sprayed with the coating solution before substantial cooling of the glass sheet can take place. This process results in the production of a base coated with a transparent electroconductive film.

When the metal bus bars are applied after the transparent electroconductive coating, other metallic compositions suitable for conducting electric current may be employed. Silver, gold, platinum, and palladium are metals which may be satisfactorily used in conjunction with a ceramic binder to deposit a metallic bus bar to the base. The metal bus bars may be applied in other ways, for example, by spraying or by painting with a metallic paint with an organic or inorganic binder which need not be fired on, or by evaporating a suitable metal strip on the glass base in a vacuum chamber.

Articles produced according to the above description, further details of which will be supplied below, are suitable for use as viewing closures or windows. Usually, they are laminated with a suitable plastic, such as polyvinyl butyral, to reinforce the glass and provide a so-called "safety glass" construction. These closures may be successfully heated by imposing an electric potential across the bus bars, thus using the conductive film as a resistance element.

In the past, an unduly high number of windshields or like panels of the type herein described have failed in use or test. This failure frequently is manifested by fracture of the glass after an electric potential has been imposed across the bus bars to cause the film to be heated to a suitable temperature (for example, 100 to 125° F.) for a period of time. One of the causes of such failure is unequal distribution of current flow to one or both of the bus bars. This is especially true in the case of panels having non-parallel bus bars and uniform surface resistivity films, or films of non-uniform resistivity with or without parallel bus bars, upon which unequal distribution of current flow will result in unequal heating.

It will be understood that when a panel is provided with non-parallel bus bars, the current flow throughout the film will tend to be highest at the point or points where the bus bars are closest together, and lowest at the point or points where the bus bars are farthest apart. In like manner, when one bus bar of a pair of bus bars (whether or not parallel) is longer than the other, the density of current flow and consequent heat generation usually tends to be highest in areas of the film adjacent the ends of the shorter bus bar.

It is desired, in the production of panels of the type hereinbefore described, to determine beforehand whether or not the particular panel to be produced is likely to develop any areas of excessive heating so that suitable means may be employed to combat such excessive heating. Furthermore, after the transparent electroconductive articles have been produced, they must be tested to determine, before the panel is put into use, the locations of areas, if any, where excessive heating is likely to occur. Testing by measuring the surface resistance at various points on the surface not only is time consuming but often inaccurate unless an unreasonable number of measurements are made.

In accordance with this invention, a novel and extremely simple method for determining the entire heat distribution and area of maximum heat generation of a refractory base coated with a transparent electroconductive film, in a single operation, has been provided. This method comprises coating the area of the base covered by the electroconductive film with an easily fusible substance, such as a wax, applying a suitable electrical potential sufficient to develop heat in the coating and to melt the coating, for example, 10 to 400 volts, between the bus bars, and observing the melting pattern of the easily fusible substance. The area at which the wax melts first is found to be the zone or area of maximum heat generation. This method of determining heat distribution is also suitable for detecting scratches in a transparent electroconductive film since areas of excessive heating tend to form at the ends of a scratch.

Several methods of performing the invention may be employed. These methods are described below in conjunction with the accompanying drawings in which:

Fig. 1 is a plan view drawn to scale of a glass panel illustrating one embodiment of the invention.

Fig. 2 is a cross section of Fig. 1 on a larger scale taken substantially along lines II—II of Fig. 1.

Figure 3:
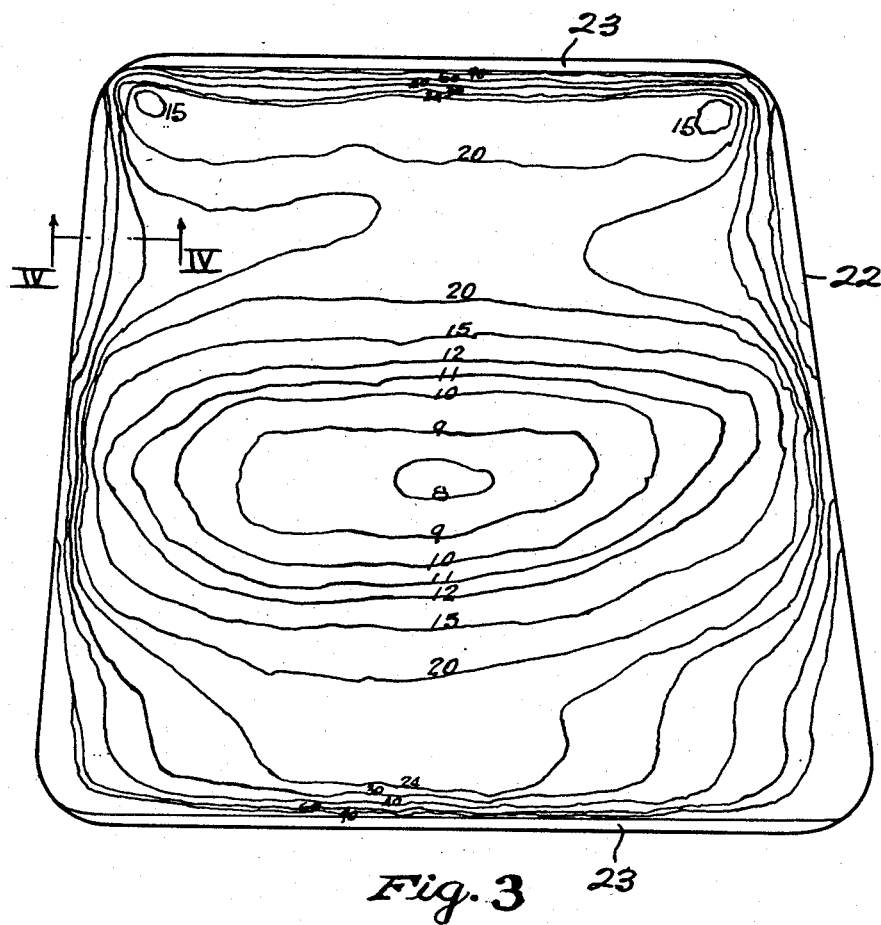
Fig. 3 is a plan view drawn to scale of a glass panel illustrating a further embodiment of the invention.

The panel illustrated in Fig. 1 and Fig. 2 comprises a glass sheet 12 of substantially rectangular shape with rounded corners having bus bars, or conductive edge strips 13 of an electroconductive metal such as silver, gold, etc. along opposite sides and close to the edges (preferably within 0.2 inch of the edge and approximately ⅛ to one inch in width) of the glass sheet. These bus bars are disposed along the margins adjacent to the longest pair of opposite edges of the panel and connected to a source of potential (not shown). The entire surface area of the panel between the bus bars is provided with a transparent electroconductive film 14 of tin oxide or other material, such as is described hereinbefore.

In accordance with this invention, a thin film 15 of beeswax having a melting point of about 140° F. is applied to the glass sheet 12. In this instance the beeswax is applied to the glass on the side of the glass opposite from that side containing the electroconductive film. As shown in Fig. 2, the beeswax is on the surface of the sheet nearest the observer whereas the electroconductive film is on the underneath side of the sheet. An electric potential is then imposed across the film 14 thereby causing the wax to melt and this voltage is maintained until an equilibrium is attained and no more wax melts. When equilibrium is attained, a line is drawn on the base outlying the area in which the wax was caused to melt. This procedure is repeated for higher voltages until all the wax has melted. As shown by the numerals on the irregular lines on the base in the drawing, voltages of 110, 120, 140, 180 and 218 volts were applied in order to melt substantially all the wax on the base. The area of maximum heat generation is that area enclosed by the line designating the boundaries of wax melting as the voltage of 110.

Figure 4:
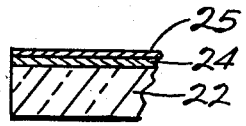
Fig. 4 is a cross section of Fig. 3 on a larger scale taken substantially along lines IV—IV of Fig. 3.

The panel in Fig. 3 and Fig. 4 illustrates a further testing procedure. The panel comprises a glass base 22 in the shape of a trapezoid having bus bars 23 on the parallel edges of the base and a transparent electro-conductive film 24 on one surface of the base. A thin film 25 of paraffin is applied to the base over the electroconductive film and a moderately high power input, 100 watts per square foot is applied to the film thereby heating the film and causing the wax to melt. This voltage is maintained continuously and at different time intervals a line is drawn on the base outlying the extent of melting of the wax at a designated length of time from the time when the voltage was first applied to the film. The irregular lines on the panel in Fig. 3 denote the extent of melting and the numerals on these lines denote the length of time of heating. Usually the wax coating is of substantially uniform thickness. While some deviation in the thickness of the wax coating is permissible, the variation should not be so great as to disturb the accuracy of the test. Wax coating having a thickness of 0.0005 to 0.0020 inch are suitable. When it is desired to determine only the area of maximum heat generation, the test may be discontinued when the wax begins to melt, it being unnecessary to melt the entire coating.

As can be seen from the description of the invention taken with regard to the panel in Fig. 1, it is not necessary that the easily fusible material be applied directly on top of the electroconductive film where the base is in the form of a thin sheet such as a sheet of plate glass or like material which can be heated by the film. In such cases an accurate determination of the area of maximum heat generation in the base and the heat distribution in the base can be made by placing the easily fusible material on the surface of the opposite side of the base in the area directly opposite from the area covered by the film. Therefore, phraseology in the claims such as "coating the area of the base covered by the film with a readily fusible material" and equivalent phraseology is intended to include coating either side of a thin base having an electroconductive coating or surface thereon capable of heating the base.

When it is desired to practice the invention with regard to laminated panels such as laminated glass windowshields, wherein the electroconductive film heating the panel is disposed on an inner surface of one of the laminated sheets adjacent the plastic interlayer, it can be seen that it is necessary to apply the easily fusible material to the surface of the base opposite from that surface containing the electroconductive film since the electroconductive film is not accessible.

Various waxlike substances may be employed. The term "wax" is intended to include those easily fusible materials having the physical properties and appearance of a wax. Thus, the term includes those compounds complying with the chemical definition of a wax, i. e., esters of fatty acids and higher atomic alcohols, and also includes numerous other compounds having properties similar to those of a wax, such as are listed and discussed as waxy compounds by Warth in "Chemistry and Technology of Waxes," published by Reinhold Publishing Co. (1947). Generally, these compounds will contain between 14 and 44 carbon atoms. Mixtures of esters of saturated fatty acids, such as lauric, palmitic, stearic and cerotic, and glycerol, generally classified as fats, are included, as well as waxy ketones, such as laurone, palmitone, cerotone, stearone, etc. Also included are animal waxes, such as beeswax, spermacetic, Chinese insect wax, cochineal wax, and white wax; vegetable waxes, such as carnauba wax, Japan wax, palm wax, and pisang wax; mineral waxes, such as earth wax, fossil wax, paraffin wax, montan wax, and peat wax; and synthetic waxes, such as seekay wax, hydrogenated castor oil, and polymerized olefin oxides and glycols.

Other organic compounds having the physical appearance and properties of waxes are within the purview of the invention. Typical examples of these compounds are halowaxes, such as chlorinated naphthalenes, chlorinated biphenyls, chlorinated paraffins, pitch and waxy condensation products of amines, such as aniline, toluidine and naphthylamine; organic acids, such as stearic, succinic, benzoic and oleic acids; and aldehydes, such as formaldehyde and furfural.

Compounds which have been found to be most suitable in the practice of the invention are waxy, water compatible polymerized olefin oxides or glycols, particularly those compounds wherein the olefin oxide or glycol contains up to 5 carbon atoms. Typical examples of these compounds are polymers of methylene, ethylene, propylene, isopropylene, butylene, isobutylene, and styrene oxides having a molecular weight within the range of 300 to 6000. Polyethylene glycol having a molecular weight of 4000 has been found to be particularly satisfactory. Many of these compounds are manufactured and sold under the trade name "Carbowax."

Some of the physical properties of these waxy compounds which make them desirable substances for use in the practice of the invention are that they are easily fusible, unctuous, essentially homogeneous, plastic, and amorphous. Usually, they melt at temperatures of 50 to 200° C. and are stable at the temperatures of the heated glass. Other low melting, easily fusible, homogeneous compositions, such as Wood's metal, are within the purview of the invention. The choice of any particular readily fusible substance, such as disclosed above, may be determined by the melting temperature of the substance and its change in appearance between the solid and melted state.

Frequently, it is desirable to apply a removable plastic coating on the refractory base prior to the application of the wax. The use of such a coating facilitates the removal of the wax after the testing. The plastic coating may be sprayed, brushed, or otherwise applied to the base. The plastic should be slightly adherent to the base in order that it will remain in place during application of the wax and during the testing of the transparent electroconductive article, but should be easily removable from the base without impairing the transparent electroconductive film in any way after performance of the test.

Plastic compositions suitable for this purpose include modified halide polymers, such as vinyl chloride dissolved in solvents such as common ketone and ester solvents, modified vinyl chloride-vinyl acetate copolymer resins in a volatile vehicle, and polyvinyl alcohol-aldehyde condensation products, such as a water emulsion of vinyl butyral stabilized with ammonium hydroxide, which composition is known to the trade as "Spray-Lat." Also suitable are variable cellulose derivatives, such as cellulose acetate, cellulose acetate-propionate, cellulose acetate-butyrate, cellulose nitrate with camphor, ethyl cellulose, etc., dissolved in suitable solvents.

The invention is particularly applicable for use in connection with a transparent tin oxide film. However, the invention is also applicable in connection with the determination of the surface conductivity properties of other electroconductive films or coatings, particularly metal oxide films. Thus, the films which may be investigated may comprise cadmium oxide, antimony oxide, zinc oxide, indium oxide, titanium oxide, chromium oxide, platinum oxide, thallium oxide, etc., which may be prepared using bromide, chloride or acetate of the corresponding metal. Transparent metal films of silver, gold, platinum, rhodium, indium or like metal, which are prepared by metal evaporation or sputtering processes, may be tested in accordance with this invention.

The invention is of particular interest for investigation of the surface electrical conductivity of transparent coatings on transparent refractory bases. However, the conductivity of other surfaces, including opaque conductive coatings, may be investigated according to this invention.

Where viewing closures for vehicles are to be provided, the base for the film normally is ordinary window or lime-soda glass. Other refractory materials, including borosilicate glass, china, mica, phosphate glass, silicon carbide, tungsten carbide, porcelain, stone or other refractory composition which melts at temperatures above 1150 to 1350° F. may be provided with electroconductive coatings in the same manner.

Although the present invention has been described with reference to the specific details of certain embodiments thereof, it is not intended that such details shall be regarded as limitations upon the scope of the invention except insofar as included in the accompanying claims.

This application is a continuation-in-part of my copending applications, Serial No. 61,191, filed November 20, 1948, now Patent No. 2,569,773, and Serial No. 220,429, filed April 11, 1951.

I claim:

1. A method of determining the heat distribution in a refractory base coated with a transparent electroconductive film, which comprises coating the area of the base covered by the transparent electroconductive film with a readily fusible material, and applying to the film an electric potential of sufficient magnitude to cause the fusible material to melt from the heat induced in the base.

2. A method of determining the location of an area of maximum heat generation in a refractory base coated with a transparent electroconductive film, which comprises coating the area of the base covered by the film with a readily fusible material and applying an electrical potential to the film of sufficient magnitude to cause the fusible material to melt at the area of maximum heat generation in the base.

3. A method of determining the heat distribution of a refractory base coated with a transparent electroconductive film, which comprises coating the area of the base covered by the transparent electroconductive film with beeswax, and applying to the film an electric potential of sufficient magnitude to cause the beeswax to melt.

4. A method of determining the heat distribution of a refractory base coated with a transparent electroconductive film, which comprises coating the area of the base covered by the transparent electroconductive film with a polymerized olefin glycol, and applying to the film an electric potential of sufficient magnitude to cause the polymerized olefin glycol to melt.

5. A method of determining the heat distribution of a refractory base coated with a transparent electroconductive film, which comprises coating the area of the base covered by the transparent electroconductive film with a polymerized olefin glycol having a molecular weight within the range of 300–6000, and applying to the film an electric potential of sufficient magnitude to cause the polymerized olefin glycol to melt.

6. A method of determining areas of heat concentration in a refractory base having a transparent electro-conductive film adhered to the base, which comprises coating the area of the base covered by the film with a substantially uniform coating of readily fusible material and applying an electrical potential to the film of sufficient magnitude to melt the fusible material through heat induced by resistance in the film.

LEIGHTON E. ORR.

References Cited in the file of this patent

UNITED STATES PATENTS

| Number | Name | Date |
|---|---|---|
| 1,869,336 | De Forest | July 26, 1932 |
| 2,128,228 | Betz et al. | Aug. 30, 1938 |
| 2,340,150 | Somes | Jan. 25, 1944 |
| 2,503,593 | Pearce et al. | Apr. 11, 1950 |